ABSTRACT OF THE DISCLOSURE

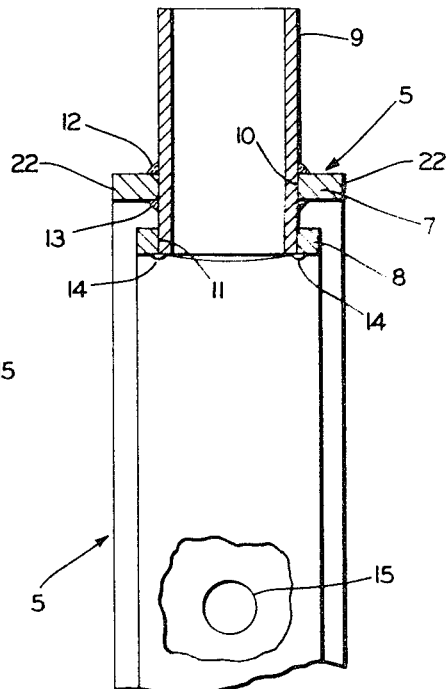
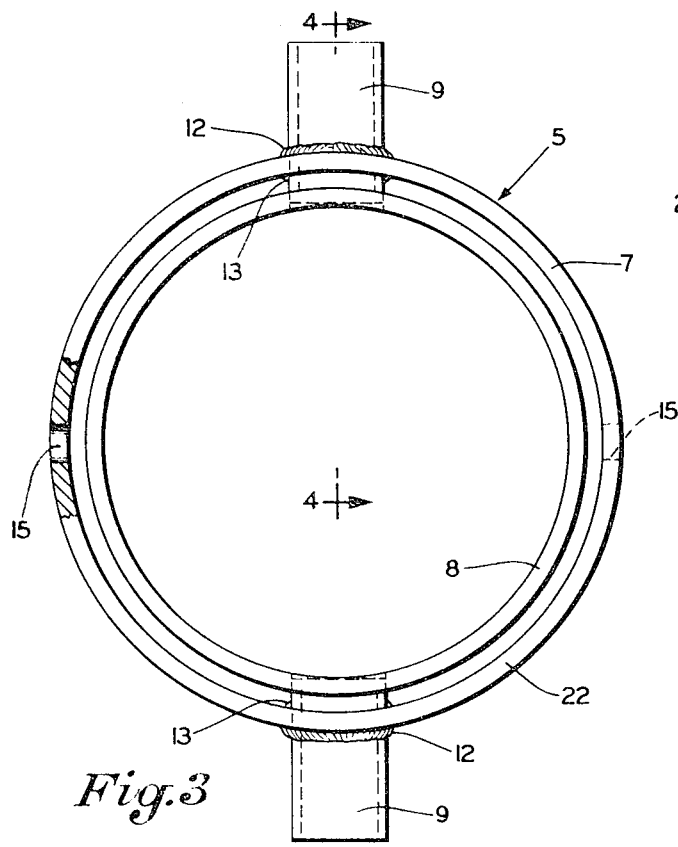
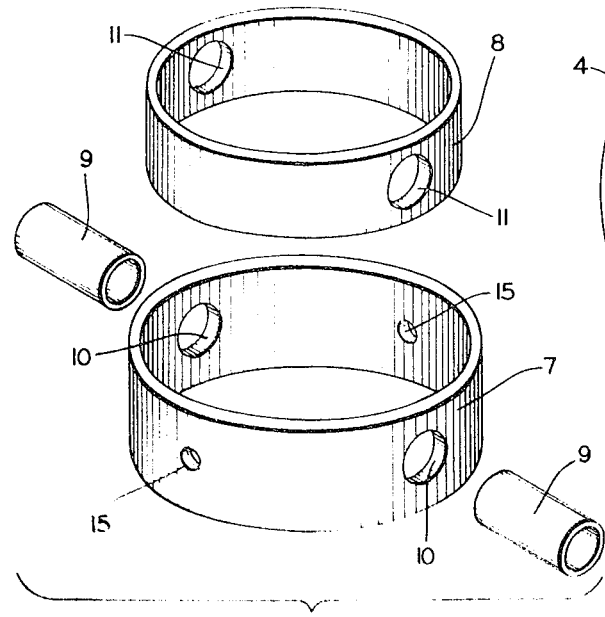
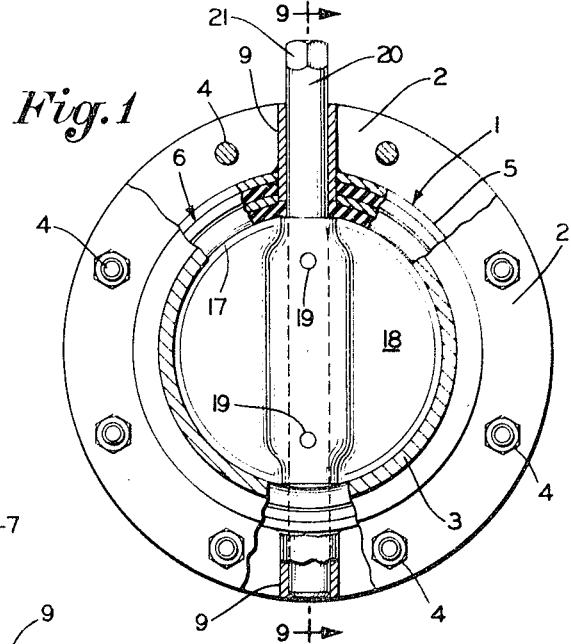
Fig. 3
Fig. 4
Fig. 1
Fig. 2
INVENTORS
Herman S. Church
and Duane J. Clark
BY
Frease & Bishop
ATTORNEY 3,667,726
FABRICATED GASKETED VALVE BODY CONSTRUCTION FOR BUTTERFLY VALVES
Herman S. Church, Cuyahoga Falls, and Duane J. Clark, Kent, Ohio, assignors to Teledyne Mid-America Corporation, Hartville, Ohio
Filed Jan. 4, 1971, Ser. No. 103,505
Int. Cl. F16k 1/22
U.S. Cl. 251—151
10 Claims

A fabricated plate metal valve body has spaced inner and outer metal ring members assembled concentrically. Valve operator trunnions are connected to the rings and extend in diametrically opposite directions. A rubber gasket is molded to and bonded with the metal rings within the outer ring and completely surrounding the inner ring. The gasket has annular sealing portions projecting axially in cross section beyond the planes of the ends of the outer ring to form seals engageable with the ends of pipe flanges with which the valve body is assembled. A butterfly valve is assembled with the valve body having an operating shaft extending through the trunnions and a movable valve disc connected to the shaft and adapted to be moved to a position in sealing contact throughout its periphery with a gasket interiorly of the inner ring. The inner diameter of the gasket is slightly smaller than the outer diameter of the valve disc which rotates within the valve body. Provision may be made to minimize any reduction in the inner diameter of the gasket incident to expansion of the gasket material from the heat of high temperature liquids passing through the valve.

BACKGROUND OF THE INVENTION

Field of the invention

The invention relates to valves and to the construction of a fabricated plate metal valve body having a gasket bonded to body components for sealing engagement with a valve disc rotatable within the body between open and closed positions to control the flow of liquid. More particularly the invention relates to a valve body construction involving spaced inner and outer metal rings with gasket material vulcanized and bonded to the inner surface of the outer ring and completely surrounding the inner ring to present a precision formed internal sealing surface within which the valve disc of a butterfly valve may be rotatably moved and sealed. Also the invention relates to butterfly valve construction of the type commonly used in water lines, pipe lines, lines for conveying heated liquids, etc. which may have the same valve body and gasket contour in cross section as standard cast metal gasketed bodies so as to be interchangeable with and to accommodate bolt circles, operating devices, etc. for mounting and operating valves installed between flanges of standard pipe couplings in pipe lines in which valves control the flow of fluids passing through the pipe lines.

Description of the prior art

Wafer-type butterfly valves having cast metal valve bodies internally lined with a molded rubber sealing gasket bonded to the cast metal of various sizes, such as three inch to thirty-six inch valves, for many years have been used to control the flow of fluids through pipe lines. Such valves have a standard valve body and gasket contour in cross section, so as to accommodate bolt circles, operating devices, etc. for installing the valves between flanges of standard pipe couplings. Such cast metal valves involve casting the valve bodies at a foundry, performing many machining operations on the cast bodies, then normally shipping the heavy cast valve bodies to a rubber plant for vulcanizing the sealing gaskets thereto, and then reshipping the gasketed valves for storage and distribution to warehouses and places of installation or use.

Attempts have been made to eliminate difficulties inherent in the manufacture and use of cast metal valve bodies by attempting to fabricate metal valve bodies from sheet or plate metal parts. Such attempts have involved use of an outer ring or band of metal, and an inner outwardly opening channel-shaped metal ring telescoped within the outer ring and with its channel legs welded all around to the outer ring.

However, in attempting to mold, vulcanize and bond the sealing gasket within such fabricated metal valve body, it was discovered that the pressures arising during the operation of molding and bonding the sealing gasket to the body were such that the gasket material pushed outward against the inner diameter surface of the web of the channel section of the inner ring, and severely distorted the channel section outward, resulting in a completely unsatisfactory product.

These difficulties, as well as the expense of welding fabricated sheet or plate metal parts together, are illustrative of problems that still exist in attempts to solve the age-old difficulties encountered with the manufacture and use of cast metal valves by substituting fabricated parts for metal castings.

SUMMARY OF THE INVENTION

Objectives of the invention include providing simple sheet or plate metal inner and outer ring members assembled together in spaced relation concentrically with diametrically opposed valve operator trunnion tubes to form a valve body assembly; providing strength by the ring members for the valve body to resist internal pressures existing in a pipe line and deflection or distortion from stress or force inmparted by tightening bolts connecting pipe flanges between which an improved valve is mounted; providing a simple fabricated wafer-type butterfly valve structure which may be manufactured from components formed by the simplest of fabricating operations and assembled with a minimum of welding operations; providing a new fabricated valve structure including inner and outer spaced valve body ring members formed of dissimilar metals so that the outer ring may provide corrosion resistance and a desired appearance; providing a new butterfly valve construction in which the sealing gasket component preferably formed of rubber completely surrounds and protects the inner strength imparting ring and which may be precision molded to provide an inner annular precision gasket sealing surface and axially facing pipe flange sealing surfaces; and providing a new butterfly valve construction which has substantially reduced weight and manufacturing costs, and increased precision as compared with prior cast metal valves, and which eliminates age-old difficulties existing in the art, solves existing problems, satisfies needs and obtains new results in the art.

These objectives and advantages are obtained by the wafer-type butterfly valve construction of the invention, the general nature of which may be stated as including valve body means having sealing gasket means bonded thereto; the valve body means including radially spaced concentric inner and outer ring members, and a pair of tubular diametrically opposed trunnion members connected to and extending radially through the spaced ring members; the sealing gasket means comprising molded, preferably rubber, gasket material contained within and bonded to the inner surface of the outer ring member, the gasket material completely surrounding and being bonded to the surfaces of the inner ring member, and the gasket material having an annular valve-disc-engageable surface; the outer ring member having axially facing edges adapted for abutment with pipe flanges between which the valve may be mounted; the gasket material also having axially facing sealing formations projecting axially beyond the abutable edges of the outer ring; and a valve disc journalled in said trunnions and rotatable into and out of closed position, and having an outer edge in sealing engagement with said valve-disc-engageable surface when the disc is in closed position.

BRIEF DESCRIPTION OF THE DRAWINGS

A preferred embodiment of the invention—illustrative of the best mode in which applicants have contemplated applying the principles—is set forth in the following description and shown in the drawings, and is particularly and distinctly pointed out and set forth in the appended claims.

FIG. 1 is a sectional view through a pipe line in which one of the improved valves is installed, with parts broken away and in section, taken on the line 1—1, FIG. 9;

FIG. 2 is an exploded perspective view of the components of the valve body;

FIG. 3 is an axial view of the valve body components assembled;

FIG. 4 is an enlarged sectional view of the assembled components, taken on the line 4—4, FIG. 3;

Similar numerals refer to similar parts throughout the drawings.

DESCRIPTION OF THE PREFFERED EMBODIMENT

Figure 5:
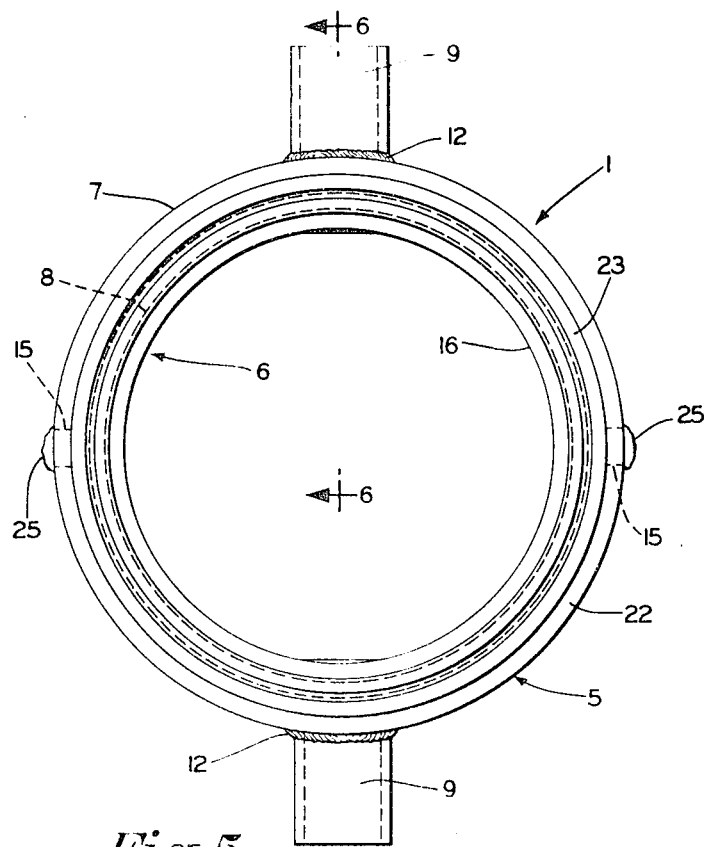
FIG. 5 is a view similar to FIG. 3 after the sealing gasket component has been molded within and bonded to the assembled body components.
Figure 6:
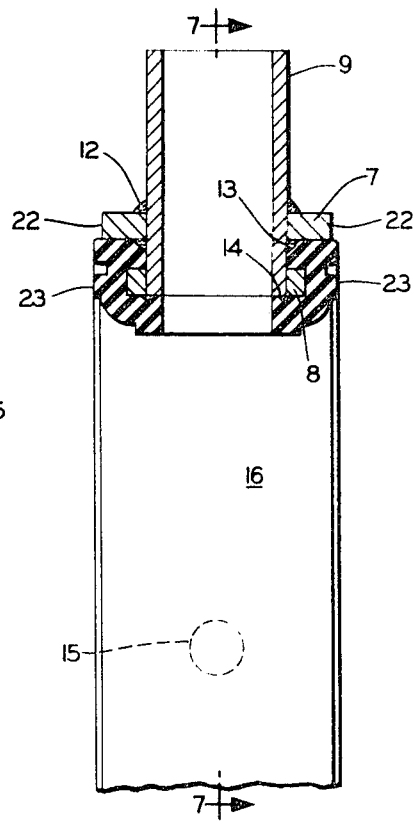
FIG. 6 is a fragmentary enlarged sectional view, taken on the line 6—6, FIG. 5.
Figure 7:
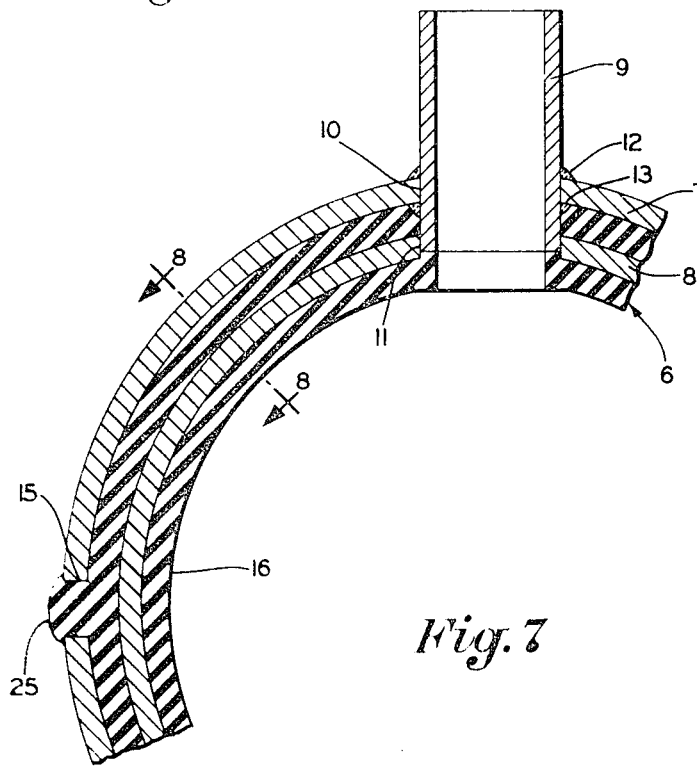
FIG. 7 is a fragmentary sectional view looking in the direction of the arrows 7—7, FIG. 6.
Figure 8:
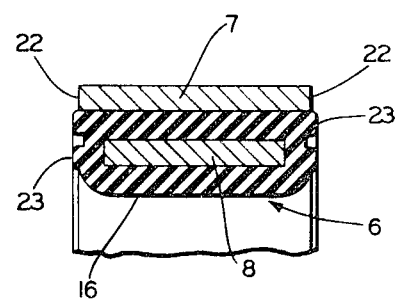
FIG. 8 is a cross section illustrating the contour of the gasketed valve body taken on the line 8—8, FIG. 7.

An improved valve structure which can replace a standard cast metal wafer-type butterfly vale is indicated generally at 1 in the drawings, mounted in a pipe line between pipe flanges 2 on the ends of pipe sections 3 (FIGS. 1 and 9) and clamped between and supported by the pipe flanges 2 by bolts 4.

The valve 1, includes a fabricated valve body assembly generally indicated at 5, and a rubber sealing gasket generally indicated at 6. The valve body components comprise an outer simple ring member 7 (FIG. 2), an inner ring member 8, and a pair of tubular trunnions 9. The components 7, 8, and 9 preferably are formed of metal and the outer ring 7 may be formed of a different material than the material of inner ring 8. For example, the outer ring 7 may be formed of stainless steel to resist corrosion and both rings may be formed of sheet or plate metal in any desired manner.

The thickness of ring members 7 and 8 are illustrated diagrammatically, since either ring may be thicker than the other in order to provide the required strength for the particular valve structure being fabricated.

Rings 7 and 8 may be formed of sheet, plate, or strip metal by cutting metal strips to the desired length and welding the ends of the strips together after forming to ring shape; or the rings may be cut from seamless tubular products having the desired composition and thickness.

The valve body assembly 5 may be fabricated by forming diametrically opposed openings 10 in outer ring member 7 and similar openings 11 in inner ring member 8. Trunnion members 9 are telescoped into aligned openings 10 and 11 in the manner shown in FIGS. 3 and 4 and are welded at 12 to the outer ring 7. The trunnions 9 also may be welded at 13 to the inner surface of ring 7 and the inner ends of trunnions 9 may be tack-welded at 14 at spaced intervals to the inner ring 8 (FIG. 4) to hold the inner ring 8 assembled in concentric relation to and within outer ring 7.

Openings 15 may be formed in the outer ring 7 for a purpose to be described, two being shown in the drawings. However, any required number of openings 15 of any required size may be formed in the outer ring 7.

The rings 7 and 8 as manufactured preferably should have uniform thickness and strength throughout so as to present uniform radial and axial strength and characteristics.

The valve body assembly 5 thus may be fabricated by the simplest of operations, eliminating expensive machining operations heretofore required for cast metal valve bodies of equivalent size, strength, and general contour; and eliminating considerable volume and weight of metal. Likewise, the valve body assembly avoids any expensive or complicated metal forming operations such as would be required if either of the ring members 7 and 8 has other than a simple ring-like shape.

The valve body assembly 5, after fabrication and assembly, is placed in a suitable simple mold and rubber sealing gasket 6 is molded, vulcanized, and bonded to the rings 7 and 8, as best illustrated in FIGS. 5 through 8. The sealing gasket material or component 6 completely surrounds the inner ring 8 (FIG. 8) and thus the molding pressure of the rubber on the ring 8 in the mold is uniform internally and externally of the ring 8 so that the ring is not distorted during molding. The outer surface of outer ring 7 is engaged by the walls on the mold cavity and thus molding pressure on the inner surface of ring 7 does not distort the outer ring 7 during molding.

Figure 9:
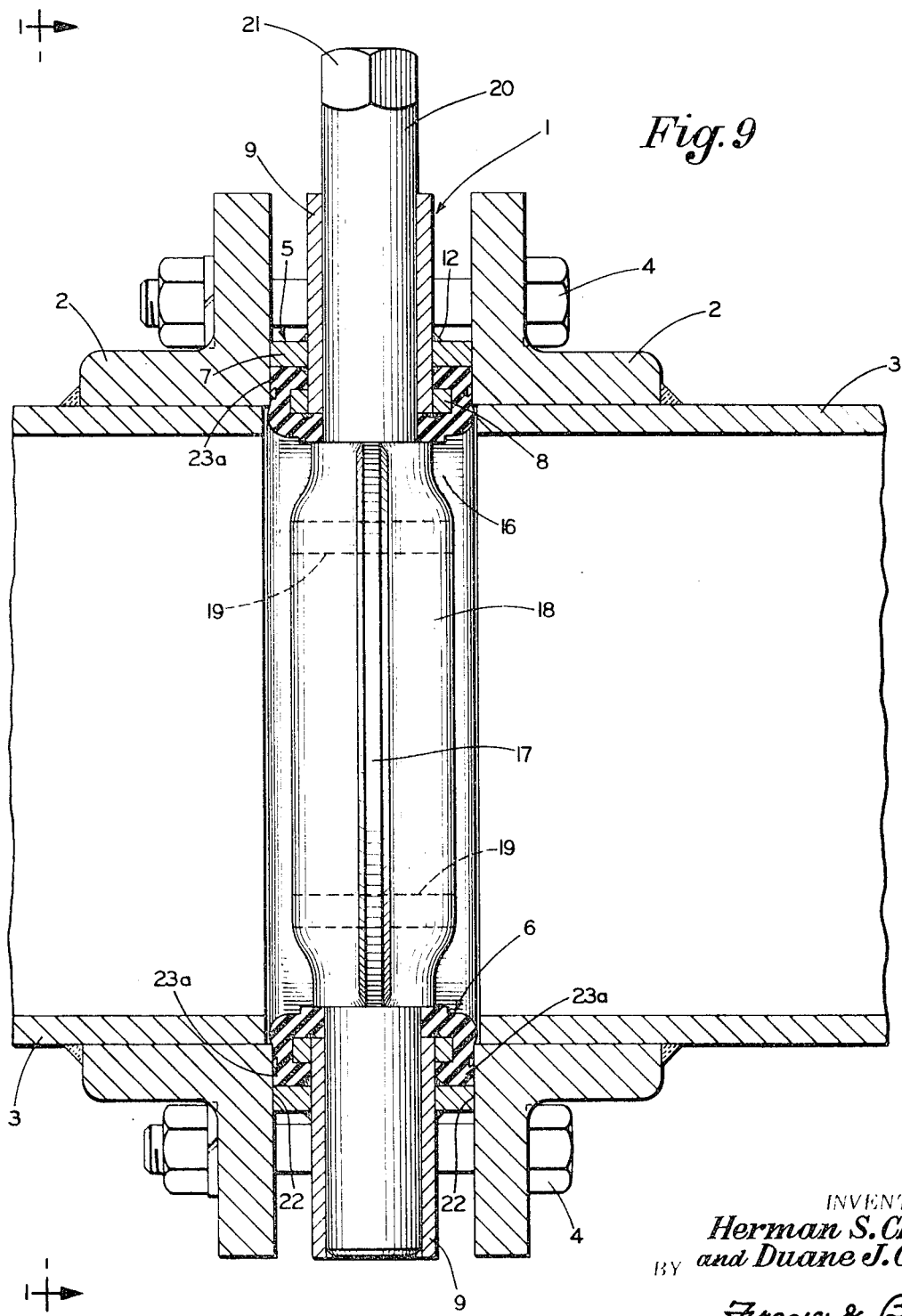
FIG. 9 is an enlarged sectional view taken on the line 9—9, FIG. 1, illustrating the improved valve installed in a pipe line.

The outer surfaces of gasket 6 may be precision molded to present an internal annular sealing surface 16 adapted to engage and seal the outer peripheral edge 17 (FIG. 9) of the butterfly valve component 18 as shown in FIGS. 1 and 9. Butterfly valve member 18 may have a typical shape, as shown, and may be connected by keys or pins 19 with an operating shaft 20. The shaft 20 may be suitably journalled in trunnions 9 and rotated with any usual operating tool that may be engaged, for example with the squared end 21 of shaft 20.

In the usual installation of a butterfly valve between pipes flanges, the pipe flanges 2 are drawn toward each other by bolts 4 in abutting contact with axially presented end faces on the valve body. Such end faces in the improved valve are the circumferential ends 22 of the outer ring 7. The joints between end faces 22 of ring 7 and the pipe flanges 2 are sealed by the axially directed gasket portions 23 illustrated in FIGS. 6 and 8 which project axially beyond the end faces 22 of ring 7, the gasket material being compressed as shown in FIG. 9 at 23a when the valve is installed and bolts 4 tightened.

Normally, the inner circumferential precision formed sealing surface 16 of the gasket 6 engaged by the valve member 18 has a diameter slightly smaller than the outer diameter of the edge 17 of member 18 so that the butterfly valve member 18 is sealed by the gasket within the valve body 5 when member 18 is in closed position as shown in FIGS. 1 and 9.

Valve strength against bursting is provided by the combined radial strength of the inner ring 8, the gasket material surrounding the ring 8 and the outer ring 7. It is possible to design the valve body strength by forming a thick inner ring 8 for strength to carry the entire load where the outer ring 7 is formed of expensive stainless steel, for example, with a relatively thin wall. Furthermore, the strength against deflection or distortion of the valve body components in an axial direction may be provided by a thick inner ring member 8, the ends of which resist the pressure developed, with intervening gasket material, by the pressure of the pipe flanges 2 when the bolts draw the pipe flanges home against the ends 22 of the outer ring 7 without distorting the outer ring if formed with a relatively thin wall section.

There is no relative stress between the inner and outer rings 8 and 7 during molding or installation of the valve, and thus the ring components 7 and 8 need not be connected in any manner to carry loading other than connection for mere assembly of the components to hold the two rings concentrically assembled when placed in the mold and during the molding operation for vulcanizing and bonding the sealing gasket material to the body components.

Furthermore, molding difficulties are eliminated because the gasket material surrounds the inner ring 8 and there is equalized pressure on all bonded surfaces between the rings and rubber during molding, thus enabling precision molding to be accomplished readily.

Rubber has a coefficient of expanison substantially greater than any metals or materials that may be involved in forming the rings 7 and 8. This fact could present a problem where the valve is used in a pipe line carrying high temperature fluids, for example, when the valve or valve body is heated to say 275° F. by fluid passing through the line. Viewing FIG. 9, but with the butterfly valve member 18 open, expansion of gasket member 6 could result in a decreased inner diameter of its inner sealing surface 16 such as to trap member 18 against opening and closing movement.

The openings 15 are formed in the outer ring 7 to avoid any such difficulties. These openings permit rubber trapped between the inner and outer rings 8 and 7 to expand outward through the openings 15 as indicated at 25 in FIG. 5 so as to prevent a buildup of pressure by expansion of the gasket material upon heating the same which would distort the inner sealing surface 16 of the gasket material to an undesirable degree.

It has been discovered that the reduction in diameter of the inner sealing surface 16 of gasket 6 upon heating the valve up to 225° F. is of the order of 0.015", which is an insufficient diameter reduction of the inner diameter 16 of the gasket 6 to trap the butterfly member 18.

If the valve must stand higher temperatures than practical with rubber used as the sealing gasket material, the gasket may be formed of silicones, Teflon, or other materials having similar characteristics which will withstand temperatures up to 600° F. and which are capable of being molded with and bonded to a valve body in a manner similar to molding and vulcanizing rubber.

The improved valve structure provides a fabricated valve body having a lower cost and reduced weight due to elimination of machining and reduction in metal, as compared with similar cast metal valves of comparable size, strength, and with which the improved valve construction is interchangeable. For example, a six inch cast valve weighs approximately 15 pounds, but the improved valve of six inch size weighs only 5 pounds. In an 18-inch size the cast valve weighs 100 pounds and the improved valve only about 35 pounds.

The improved construction in its final state presents the same valve body contour that is present in similar cast metal valves, provides the required sealing characteristics between the valve body and pipe flanges, and is adapted for connection by bolts extending between adjacent pipe flanges and around the valve body without altering the size and location of the bolts.

Also the improved valve construction of the invention avoids the difficulties heretofore encountered in prior attempts to construct a fabricated valve body to replace a cast body.

The simplicity of the components and of the assembly of the components to form the valve body, and of the molding and bonding of the sealing gasket material thereto, enables the new valve structure to be utilized in valves of usual sizes, say from three to thirty-six inch valves, and provides all the described advantages for valves of all sizes.

Accordingly, the new valve construction is characterized by a simple, strong and effective fabricated valve body structure with a sealing gasket precision molded thereto; avoids costly operations heretofore characterizing the manufacture of valves with cast bodies with which the new valve structures are interchangeable; provides a new butterfly valve construction having reduced weight as compared to prior cast metal valves; and provides structures and arrangements which eliminate difficulties existing in the art, and which achieve the stated objectives and solve problems that have existed in the art.

In the foregoing description, certain terms have been used for brevity, clearness, and understanding; but no unnecessary limitations are to be implied therefrom beyond the requirements of the prior art because such terms are used for descriptive purposes and are intended to be broadly construed.

Moreover, the description and illustration of the invention is by way of example, and the scope of the invention is not limted to the exact details shown or described.

Having now described the features, discoveries and principles of the invention, the manner in which the improved valves may be made, the characteristics of the new construction, and the advantageous, new, and useful results obtained; the new and useful structures, devices, elements, arrangements, parts and combinations are set forth in the appended claims.

We claim:

1. Wafer-type butterfly valve construction including valve body means having sealing gasket means bonded thereto; the valve body means including radially spaced concentric inner and outer ring members, and a pair of tubular diametrically opposed trunnion members connected to and extending radially through the spaced ring members; the sealing gasket means comprising molded gasket material contained within and bonded to the inner surface of the outer ring member, the gasket material completely surrounding and being bonded to the surfaces of the inner ring member, and the gasket material having an inner annular valve-disc-engageable surface; the outer ring member having axially facing edges adapted for abutment with pipe flanges to which the valve may be connected; the gasket material also having axially facing sealing formations projecting axially beyond the abutable edges of the outer ring; and a valve disc journalled in said trunnions and rotatable into and out of closed position, and having an outer edge in sealing engagement with said valve-disc-engageable surface when the disc is in closed position.

2. The construction defined in claim 1 in which the gasket material is a rubber containing material, and in which the ring members are formed of metal.

3. The construction defined in claim 1 in which the gasket material is a rubber containing material, and in which the outer ring member is formed of corrosion resisting material.

4. The construction defined in claim 3 in which the outer ring member is formed of stainless steel.

5. The construction defined in claim 1 in which the gasket material has a different coefficient of expansion than that of either of the ring members, and in which opening means is formed in the outer ring member to permit gasket material trapped between the inner and outer ring members to expand through said opening means.

6. The construction defined in claim 1 in which the ring members are formed of metal, in which the gasket material has a greater coefficient of expansion than that of either of the ring members, and in which opening means is formed in the outer ring member to permit gasket material trapped between the inner and outer ring members to expand through said opening means.

7. The construction defined in claim 1 in which the outer ring member is formed of corrosion resisting metal, in which the gasket material is a rubber containing material has a greater coefficient of expansion that than of either either of the ring members, and in which opening means is formed in the outer ring member to permit gasket material trapped between the inner and outer ring members to expand through said opening means.

8. The construction defined in claim 1 in which the ring members are tubular in shape.

9. The construction defined in claim 1 in which each ring member comprises a tubular wall, and in which each tubular wall has a uniform wall thickness.

10. The construction defined in claim 9 in which the inner ring member has a greater wall thickness than the outer ring member.

References Cited
UNITED STATES PATENTS

| | | | |
|---|---|---|---|
| 3,233,861 | 2/1966 | Stillwagon | 251—306 X |
| 3,314,641 | 4/1967 | Overbaugh | 251—306 X |
| 3,537,683 | 11/1970 | Snell, Jr. | 251—306 |
| 3,567,180 | 3/1971 | Williams | 251—306 |

WILLIAM R. CLINE, Primary Examiner

U.S. Cl. X.R.

251—306, 366